US006735598B1

(12) United States Patent
Srivastava

(10) Patent No.: US 6,735,598 B1
(45) Date of Patent: May 11, 2004

(54) METHOD AND APPARATUS FOR INTEGRATING DATA FROM EXTERNAL SOURCES INTO A DATABASE SYSTEM

(75) Inventor: Alok Srivastava, Chelmsford, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/429,839

(22) Filed: Oct. 29, 1999

(51) Int. Cl.$^7$ ................................................ G06F 17/00
(52) U.S. Cl. .............................. 707/103 R; 707/103 Y; 707/200
(58) Field of Search ........................ 707/1–10, 100–104, 707/200–206, 500, 526; 715/500.1, 501.1, 526

(56) References Cited

U.S. PATENT DOCUMENTS

| | | | | |
|---|---|---|---|---|
| 5,850,544 A | * | 12/1998 | Parvathaneny et al. | 707/101 |
| 5,995,961 A | * | 11/1999 | Levy et al. | 707/4 |
| 6,014,138 A | * | 1/2000 | Cain et al. | 345/826 |
| 6,374,252 B1 | * | 4/2002 | Althoff et al. | 707/102 |

* cited by examiner

Primary Examiner—Alford Kindred
(74) Attorney, Agent, or Firm—Gordon E. Nelson

(57) ABSTRACT

Techniques used in a relational database system for defining subclasses of built-in classes and thereby achieving columns in database tables which contain polymorphic objects of the built-in classes. The methods for the subclasses are contained in named packages. A table in the database system's schema relates the package name to a storage location managed by the relational database system that contains the compiled code for the package. When a method from the package is invoked, a dynamic linker uses the name and the table to locate the compiled code and then executes the compiled code. Users may define their own subclasses by writing a package and then compiling the package using a compiler belonging to the database system. The compiler puts the compiled code in one of the storage locations and modifies the table so that the package name is related to the storage location. The compilation and binding techniques may be used generally to implement plugins in the database system. One use of subclasses is to make objects that are capable of handling data from different kinds of data sources that are external to the database system, including data from files on the system upon which the database system is running and data from HTTP servers. In a preferred embodiment, these objects can also handle data stored locally within the database system and can transfer data between the external source and the local storage. Another use of subclasses is to make it possible for objects that handle data that represents the same kind of entities, but use different formats to read the format information from the data itself.

60 Claims, 16 Drawing Sheets

```
610 CREATE OR REPLACE PACKAGE BODY ORDX_MY_SOURCE
    AS
      -- functions/procedures
611   FUNCTION processCommand(
                        obj  IN OUT NOCOPY ORDSYS.ORDSource,
                        ctx  IN OUT RAW,
                        cmd  IN VARCHAR2,
                        arglist IN VARCHAR2   605
                        result OUT RAW)
      RETURN RAW
      IS
      --Your variables go here 607
      BEGIN
      --Your code goes here  609
      END processCommand;
612   PROCEDURE import( obj IN OUT NOCOPY ORDSYS.ORDSource,
                        ctx IN OUT RAW,
                        dlob IN OUT NOCOPY BLOB,
                        mimetype OUT VARCHAR2,
                        format OUT VARCHAR2)
      IS
      --Your variables go here
      BEGIN
      --Your code goes here
      END import;
613   PROCEDURE importFrom( obj IN OUT NOCOPY
      ORDSYS.ORDSource,
                        ctx IN OUT RAW,
                        dlob IN OUT NOCOPY BLOB,
                        mimetype OUT VARCHAR2,
                        format OUT VARCHAR2
                        loc IN VARCHAR2,
                        name IN VARCHAR2)
      IS
      --Your variables go here
      BEGIN
      --Your code goes here
      END importFrom;
```

603 encompasses lines from FUNCTION processCommand through END processCommand;

```
615 PROCEDURE export( obj IN OUT NOCOPY ORDSYS.ORDSource,
                    ctx IN OUT RAW,
                    dlob IN OUT NOCOPY BLOB,
                    loc IN VARCHAR2,
                    name IN VARCHAR2)
    IS
    --Your variables go here
    BEGIN
    --Your code goes here
    END export;
617 FUNCTION getContentLength( obj IN ORDSYS.ORDSource,
                    ctx IN OUT RAW)
    RETURN INTEGER
    IS
    --Your variables go here
    BEGIN
    --Your code goes here
    END getContentLength;
619 FUNCTION getSourceAddress(obj IN ORDSYS.ORDSource,
                    ctx IN OUT RAW,
                    userData IN VARCHAR2)
    RETURN VARCHAR2
    IS
    --Your variables go here
    BEGIN
    --Your code goes here
    END getSourceAddress;
621 FUNCTION open(obj IN OUT NOCOPY ORDSYS.ORDSource,
                    userArg IN RAW,
                    ctx OUT RAW)
    RETURN INTEGER
    IS
    --Your variables go here
    BEGIN
    --Your code goes here
    END open;
623 FUNCTION close(obj IN OUT NOCOPY ORDSYS.ORDSource,
                    ctx IN OUT RAW)
    RETURN INTEGER
    IS
    --Your variables go here
    BEGIN
    --Your code goes here
    END close;
```

FIG. 6 B

```
625 FUNCTION trim(obj IN OUT NOCOPY ORDSYS.ORDSource,
                 ctx IN OUT RAW,
                 newlen IN INTEGER)
    RETURN INTEGER
    IS
    --Your variables go here
    BEGIN
    --Your code goes here
    END trim;
627 PROCEDURE read(obj IN OUT NOCOPY ORDSYS.ORDSource,
                   ctx IN OUT RAW,
                   startPos IN INTEGER,
                   numBytes IN OUT INTEGER,
                   buffer OUT RAW)
    IS
    --Your variables go here
    BEGIN
    --Your code goes here
    END read;
629 PROCEDURE write(obj IN OUT NOCOPY ORDSYS.ORDSource,
                    ctx IN OUT RAW,
                    startPos IN INTEGER,
                    numBytes IN OUT INTEGER,
                    buffer OUT RAW)
    IS
    --Your variables go here
    BEGIN
    --Your code goes here
    END write;
    END ORDX_MY_SOURCE;
    /
    show errors;
```

FIG. 6C

```
DECLARE                              ⎫
    obj ORDSYS.ORDSource ;           ⎪
    res RAW(4000);                   ⎬ 703
    result RAW(4000);                ⎪
    command VARCHAR2(4000);          ⎪
    argList VARCHAR2(4000);          ⎭
    ctx RAW(4000)  :=NULL;
BEGIN
    select s into obj from TS where N =1 for UPDATE; 705
    command := 'xxx ';     ⎫
                           ⎬ 707
    argList := 'yyy ';     ⎭
    res := obj.processCommand(ctx, command, argList, result);709
    UPDATE TS SET s=obj WHERE N=1 ; 711
    COMMIT;
    EXCEPTION
      ⎧ WHEN ORDSYS.ORDSourceExceptions.METHOD_NOT_SUPPORTED THEN
      ⎪     DBMS_OUTPUT.put_line('Source METHOD_NOT_SUPPORTED aught');
713 ⎨  WHEN ORDSYS.ORDSourceExceptions.SOURCE_PLUGIN_EXCEPTION THEN
      ⎪     DBMS_OUTPUT.put_line('SOURCE PLUGIN EXCEPTION caught');
      ⎩ WHEN OTHERS THEN
            DBMS_OUTPUT.put_line('OTHER EXCEPTION caught');
END;
/

```
CREATE OR REPLACE TYPE ORDAudio
AS OBJECT
(
-- ATTRIBUTES 1203 description VARCHAR2(4000),
source ORDSource,
format VARCHAR2(31), 1205
mimeType VARCHAR2(4000),
comments CLOB,
-- AUDIO RELATED ATTRIBUTES 1207
encoding VARCHAR2(256),
numberOfChannels INTEGER,
samplingRate INTEGER,
sampleSize INTEGER,
compressionType VARCHAR2(4000),
audioDuration INTEGER, -- METHODS 1209
-- Methods associated with audio attributes accessors 1211
MEMBER PROCEDURE setFormat(knownformat IN VARCHAR2), 1215
MEMBER FUNCTION getFormat RETURN VARCHAR2, 1217                              1213
MEMBER FUNCTION getFormat(ctx IN OUT RAW) RETURN VARCHAR2, 1219
MEMBER PROCEDURE setEncoding(knownEncoding IN VARCHAR2),
MEMBER FUNCTION getEncoding RETURN VARCHAR2,
MEMBER FUNCTION getEncoding(ctx IN OUT RAW) RETURN VARCHAR2,
MEMBER PROCEDURE setNumberOfChannels(knownNumberOfChannels IN
                        INTEGER),
MEMBER FUNCTION getNumberOfChannels RETURN INTEGER,
MEMBER FUNCTION getNumberOfChannels(ctx IN OUT RAW) RETURN
                        INTEGER,
MEMBER PROCEDURE setSamplingRate(knownSamplingRate IN
                        INTEGER),
MEMBER FUNCTION getSamplingRate RETURN INTEGER,
MEMBER FUNCTION getSamplingRate(ctx IN OUT RAW) RETURN
                        INTEGER,
MEMBER PROCEDURE setSampleSize(knownSampleSize IN INTEGER),
MEMBER FUNCTION getSampleSize RETURN INTEGER,
MEMBER FUNCTION getSampleSize(ctx IN OUT RAW) RETURN INTEGER,
MEMBER PROCEDURE setCompressionType(knownCompressionType IN
                        VARCHAR2),
MEMBER FUNCTION getCompressionType RETURN VARCHAR2,
MEMBER FUNCTION getCompressionType(ctx IN OUT RAW) RETURN
                        VARCHAR2,
MEMBER PROCEDURE setAudioDuration(knownAudioDuration IN
                        INTEGER),
MEMBER FUNCTION getAudioDuration RETURN INTEGER,
MEMBER FUNCTION getAudioDuration(ctx IN OUT RAW) RETURN
                        INTEGER,

```
MEMBER PROCEDURE setKnownAttributes(
                    knownFormat IN VARCHAR2,
                    knownEncoding IN VARCHAR2,
                    knownNumberOfChannels IN INTEGER,
                    knownSamplingRate IN INTEGER,
                    knownSampleSize IN INTEGER,
                    knownCompressionType IN VARCHAR2,
                    knownAudioDuration IN INTEGER), -- Methods associated with setting all the properties
MEMBER PROCEDURE setProperties(ctx IN OUT RAW),
MEMBER FUNCTION checkProperties(ctx IN OUT RAW) RETURN
                    BOOLEAN,
MEMBER FUNCTION getAttribute(
                    ctx IN OUT RAW,
                    name IN VARCHAR2) RETURN VARCHAR2,
MEMBER PROCEDURE getAllAttributes(
                    ctx IN OUT RAW,
                    attributes IN OUT NOCOPY CLOB), -- Methods associated with audio processing    1221
MEMBER FUNCTION processCommand(
                    ctx IN OUT RAW,
                    cmd IN VARCHAR2,
                    arguments IN VARCHAR2,
                    result OUT RAW)
                    RETURN RAW
```

```
CREATE OR REPLACE PACKAGE ORDX_AIFF_AUDIO   1303
authid current_user
AS

--AUDIO ATTRIBUTES ACCESSORS
  FUNCTION   getFormat(ctx IN OUT RAW, obj IN ORDSYS.ORDAudio)    1213
              RETURN VARCHAR2;
  FUNCTION   getEncoding(ctx IN OUT RAW, obj IN
              ORDSYS.ORDAudio)
              RETURN VARCHAR2;
  FUNCTION   getNumberOfChannels(ctx IN OUT RAW, obj IN
              ORDSYS.ORDAudio)
              RETURN INTEGER;
  FUNCTION   getSamplingRate(ctx IN OUT RAW, obj IN
              ORDSYS.ORDAudio)
              RETURN INTEGER;
  FUNCTION   getSampleSize(ctx IN OUT RAW, obj IN
              ORDSYS.ORDAudio)
              RETURN INTEGER;
  FUNCTION   getCompressionType(ctx IN OUT RAW, obj IN
              ORDSYS.ORDAudio)
              RETURN VARCHAR2;
  FUNCTION   getAudioDuration(ctx IN OUT RAW, obj IN
              ORDSYS.ORDAudio)
              RETURN INTEGER;
  PROCEDURE setProperties(ctx IN OUT RAW, obj IN OUT NOCOPY
              ORDSYS.ORDAudio);
  FUNCTION checkProperties(ctx IN OUT RAW, obj IN OUT
              ORDSYS.ORDAudio)
              RETURN NUMBER;
  FUNCTION   getAttribute(ctx IN OUT RAW,
                          obj IN ORDSYS.ORDAudio,
                          name IN VARCHAR2) RETURN VARCHAR2;
  -- must return name=value; name=value; ...  pairs
  PROCEDURE getAllAttributes(ctx IN OUT RAW,
                          obj IN ORDSYS.ORDAudio,
                          attributes IN OUT NOCOPY CLOB);

-- AUDIO PROCESSING METHODS
  FUNCTION   processCommand(
                                ctx        IN OUT RAW,
                                obj        IN OUT NOCOPY
ORDSYS.ORDAudio,
                                cmd        IN VARCHAR2,
                                arguments IN VARCHAR2,
                                result OUT RAW)
              RETURN RAW;
END;
/
show errors;

METHOD AND APPARATUS FOR INTEGRATING DATA FROM EXTERNAL SOURCES INTO A DATABASE SYSTEM

BACKGROUND OF THE INVENTION

1. Field of the Invention

The invention relates generally to database systems and more specifically to database systems which may be used to access data that is not stored within the database system.

2. Description of Related Art

One of the most common uses of computer systems is to find information. Two techniques that are commonly employed to find information are running a query to find data in a database system and using a search engine to find data from sources that are accessible via a network. Each of these techniques presently offers important advantages and has important limitations.

DATABASE SYSTEMS

Data which is to be accessed by a computer has been typically stored in database systems. The data in database systems is organized in a precisely-defined fashion and is accessible by means of queries written in a query language which can be interpreted by the database system. The syntax and semantics of the query language are also precisely defined. Queries can consequently be written either by human beings directly or by programs. Moreover, queries may be saved and reused, and will each time produce results which are the same except for changes that may have occurred in the database since the last time the query was run. The precise definitions of the data and the query language further permit extensive optimization of the queries.

Most database systems also have transaction controls. At a minimum, reads of data in the database and updates of data in the database are implemented in a fashion which prevents data from being updated by one query while it's being read by another query.

Transaction controls may be extended to permit recovery when a failure occurs in the course of a multi-step transaction. Typically, when a failure occurs, the steps of the transaction which took place before the failure occurred are undone and the transaction begun anew.

A final advantage of database systems is historical—because database systems have been the technique of choice for many years for making data accessible via computer, most organizations already have large amounts of data in database systems, and it is easier to extend the database system than it is to start over with new techniques for accessing data.

In the age of the Internet, traditional database systems have two serious disadvantages: first, the data in the database must belong to a small set of primitive data types for which the database system has built-in operations. A typical database system may store data having character string, Boolean, integer, floating-point, or fixed decimal data types. Second, the data must be contained within the database system or at least local to the computer system upon which the database system is running. What this means in the Internet context is that a query on a traditional database system may return a URL for a remote Web page (universal resource locator—an address of a Web page) which can then be used to fetch the remote Web page to which it refers, but cannot itself return the remote Web page, first, because the Web page is not local to the database system's computer system, and second, because the Web page is not one of the primitive types that the database system can deal with.

In the Internet and in so-called intranets, private networks which employ the Internet protocols, information is located by means of search engines. A search engine indexes words to the URLs of Web pages that contain the words, and the user locates information by either listing the words he or she is interested in or making a Boolean expression containing the words and providing the list or the Boolean expression to the search engine, which then returns the URLs of Web pages that contain the desired words. The Web pages may be located on any publicly-accessible server and may have any kind of content—they may contain not only words, but images, audio clips, video clips, and so on.

The amount of material that can be returned by a Web search and the variety of that material are thus beyond anything which can be dealt with by traditional database systems.

On the other hand, searching for information by means of a search engine is at best an inexact task. The word lists or Boolean expressions given to the search engines are not query language statements and the Web does not have a precisely-defined organization. A search engine may have pages in its index that no longer exist in the Web and may also have not yet indexed pages that do exist. Each search engine has a different coverage of the Web pages and a different algorithm for deciding what URLs to return in response to a given word list or Boolean expression.

The distributed nature of the Web also makes any kind of transaction control difficult. The search engine simply provides the user with a list of URLs; what the user gets when he or she then clicks on one of the URLs is the copy of the page represented by the URL which is most local to the user; thus, if there is a copy in a cache that is closer to the user than the original, that is the copy the user will get. Meanwhile, of course, the original copy may have changed.

Finally, of course, the Internet is so new that the kinds of information traditionally stored in database systems are simply not available in a manner which makes the information easily accessible via search engines.

Some efforts have been made in traditional database systems to at least overcome the restriction that the data stored in the database system belong to a small set of predefined types. FIG. 1 gives an example of a technique used in the Oracle8™ database system manufactured by Oracle Corporation. Shown in the figure is computer system storage 101 for the computer system upon which the database system is executing. Two parts of storage 101 are of interest here: storage 102 for the components of the database management system and storage 120 for the computer system's file system. The Oracle8 database system is a relational database system, that is, the information in the database system is stored in the form of tables 107 in storage 102. Each table is made up of a number of named columns with predefined data types and some number of rows. Each row has a field for each of the columns. Thus, table 107(i) has columns including columns 111 and 113 and rows 115(a . . . n). Each row has a field for each column; in table 107, the fields for column 111 appear as fields 111(a . . . n) and those for column 113 appear as 113(a . . . n). Also included in storage 102 are DBMS routines 105, which perform the operations defined for the query language on the data in the tables 107.

In order to deal with data objects that have data types other than those that are predefined for the table columns and also with very large objects, a table 107(i) in the Oracle8 database system may have columns in which the fields of the column do not directly contain the data they represent, but instead point to objects of undefined type which contain the data.

One class of such objects is large objects, or LOBs 116, which are stored in storage 102 for the DBMS along with the database system's tables 107 and routines 105. One kind of large object is termed a BLOB, that is, a bit large object. In FIG. 1, each field 113(a . . . n) of column 113 represents a BLOB. The BLOBs represented by the fields are shown at BLOB 117(a . . . n). When a query reads a field 113(i) that represents a BLOB, it simply returns BLOB 117(i)'s contents to the source of the query, which then interprets the contents however it pleases. Similarly, when a query writes a field 113(j) that represents a BLOB, the query simply takes whatever bits it receives from the source of the query and writes them to BLOB 117(j). Since large objects 116 are stored in DBMS storage 102, they are subject to the DBMS system's transaction control.

Another class of such objects is bitfiles, or Bfiles 119, which are stored in file system storage 120 of the computer system that the database system is running on. In FIG. 1, fields 111(a . . . n) of column 111 represent Bfiles 119(a . . . n). Queries involving fields that represent Bfiles 119 work analogously to queries involving fields that involve BLOBs.

When a query reads a field 111(i) that represents a Bfile 119(i), bits are read from Bfile 119(i) and returned to the source of the query, which interprets them; when a query writes a field 111(j) that represents a Bfile 119(j), whatever bits are received from the source of the query are written to Bfile 119(j). Bfiles 119 are not subject to the DBMS system's transaction control.

While the Bfiles 119 and BLOBs 117 of FIG. 1 make it possible to escape the constraints of the database system's primitive types, they have serious limitations. The fields of a given column may represent either BLOBs 117 or Bfiles 119; a given field cannot represent one at one time and the other at another, even though the BLOB 117 or Bfile 119 my contain the same kind of data. The choice as to whether a field represents a BLOB 117 or Bfile 119 must be made when table 107 is defined. One consequence of this is that the data represented by a given field cannot be under transaction control at one point and not under transaction control at another point. Another limitation is the fact that Bfiles 119 must belong to the file system of the computer system that the database system is running on. Thus, the techniques of FIG. 1 still do not provide a way of integrating data at remote locations into a database system. Finally, the data returned by a query to a Bfile 119 must go through the database system. While this is not a serious problem for text or even for static data like images, it is for streaming data such as audio or video clips. What is needed for this kind of data is a technique whereby the result of the query is a direct connection between the source of the query and the source of the data, so that the data, once located using the database system, can flow directly from the source of the data to the source of the query.

It is an object of the present invention to overcome the foregoing problems of present database and search engine technology and to provide better integration of remote sources having many types of data into a database system.

SUMMARY OF THE INVENTION

The invention attains its object by providing built-in classes in the relational database system and permitting users to define subclasses of the built-in classes for dealing with different kinds of data sources and differently-formatted data within the data sources. In a database column containing data objects of the built-in class, the data objects in different fields of the column may have different subclasses. The built-in classes have settable attributes which specify subclasses; the subclass of an object may thus be dynamically changed. When a user defines a subclass, the user also defines the attribute value that specifies the subclass.

In a preferred embodiment, the executable code for the method is stored in storage controlled by the database system and is located by means of a table in the database system's schema which relates the object's class and subclass to the location of the executable code. Invocation of the method is done by means of a dynamic linker that uses the object's class and the subclass specifier to locate the executable code and then invokes the code. To add a user-defined subclass, the user creates a package which contains source code for at least some of the subclass's methods. The package's name specifies the class and subclass. The source code is compiled by a compiler in the database system to produce executable code and the compiler then modifies the table so that it relates the class and subclass specified in the package's name to the location of the code in the database system.

One of the built-in classes is a built-in ORDSource class whose data objects specify the source of the data represented by fields of the class. Different subclasses of the ORDSource class correspond to different kinds of sources of data. Each ORDSource object also has storage associated with it that is local to the database system. Among the attributes of the ORDSource class is one which specifies whether the source of the data is local, i.e., the local storage associated with the ORDSource object, or is non-local. The methods include a method for setting the attribute that specifies whether the source of data is local or not and methods for importing data from a non-local source to the local storage and exporting data from the local storage to the non-local source. Another of the methods permits commands to be issued to non-local data sources. In a preferred embodiment, the ORDSource class is a component of built-in classes for objects that represent image data, audio data, or video data.

The user may define subclasses of the classes for image data, audio data, or video data by writing FORMAT packages that specify methods for reading format information from the image data, audio data, or video data. Objects belonging to the classes for image data, audio data, and video data include a format attribute which specifies a particular format package. Among the methods included in a format package is one which reads the format from the data itself.

The techniques used for compiling packages that define methods for subclasses and then locating and executing the code for the packages can be used generally for plugins in the database system.

Other objects and advantages will be apparent to those skilled in the arts to which the invention pertains upon perusal of the following Detailed Description and drawing, wherein:

BRIEF DESCRIPTION OF THE DRAWING

FIGS. 6A, B, and C are a template for a user-defined subclass of ORDSource;

FIG. 7 is an example of code using the processCommand method;

FIGS. 12A and B shows portions of the definition of the ORDAudio type; and

FIG. 13 shows a package template for FORMAT methods.

Figure 1:
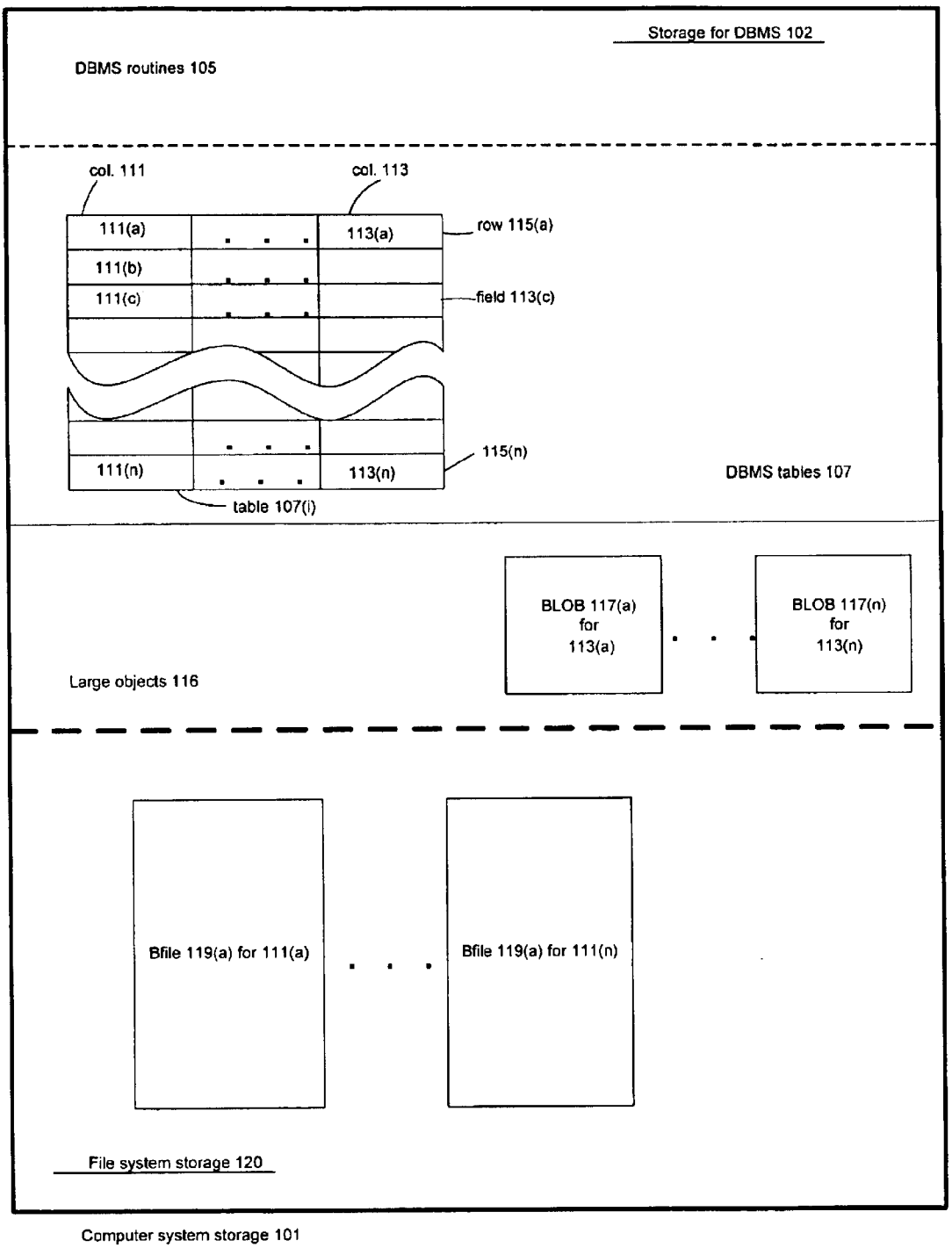
FIG. 1 is an overview of salient features of a prior-art database system.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will first provide an overview of the invention, then provide details of an implementation in a preferred embodiment, and finally examples of applications of the invention.

Figure 2:
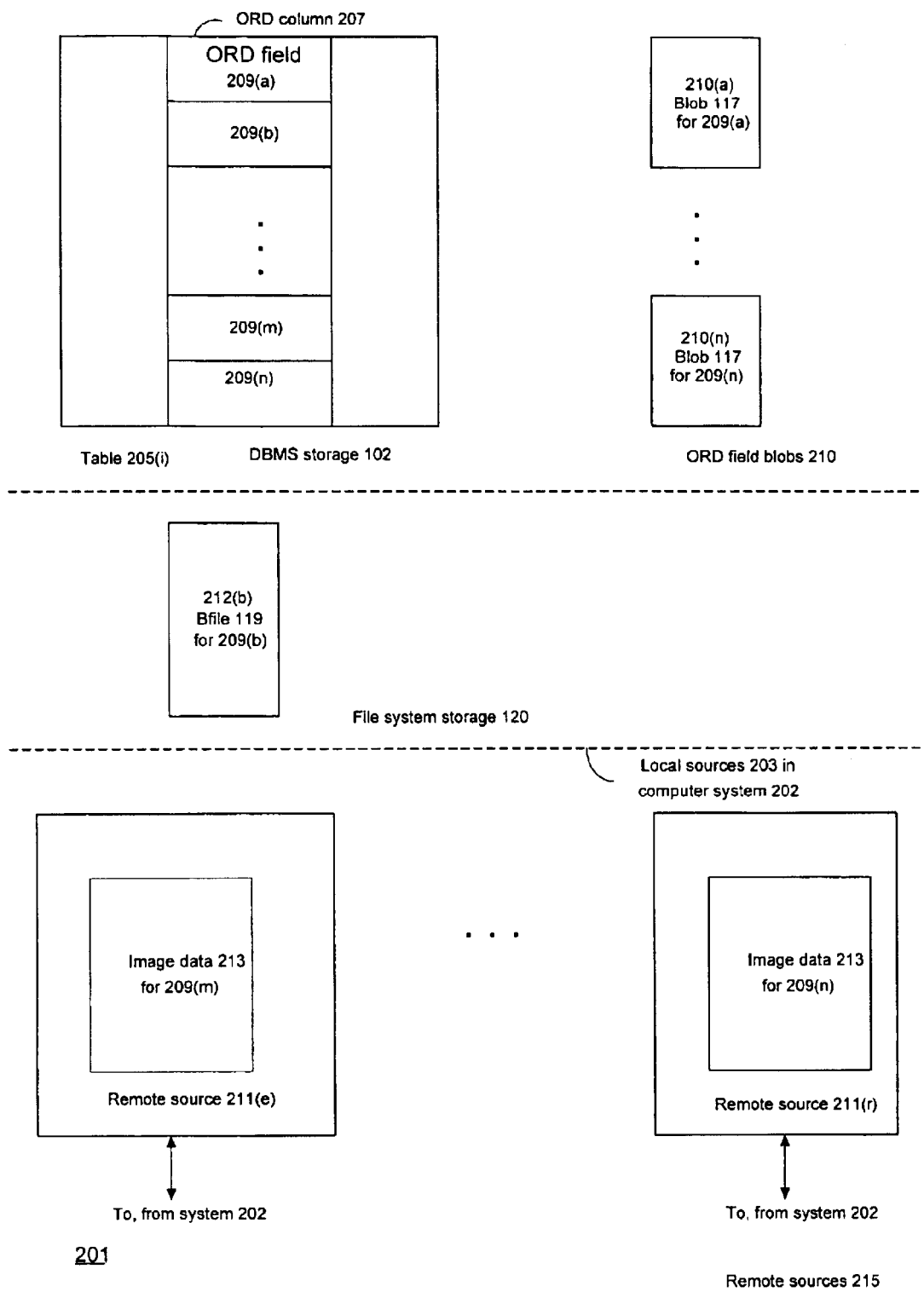
FIG. 2 shows ORD columns and data sources in a preferred embodiment of the invention.

Overview of the Invention: FIG. 2

FIG. 2 shows a modification of the database system of FIG. 1 which permits a data source represented by a field of a column to be contained at any given time in a BLOB 117 in DBMS storage 102, in a Bfile 119 in file system storage 120, or in a remote source such as a Web site and which also permits data to be imported into a BLOB 117 from a source external to DBMS storage 102 or exported from BLOB 117 to such an external source. As is apparent from the foregoing, different fields in the column may at the same time represent sources that are contained in BLOBs 117, Bfiles 119, or remote sources. A remote source may be any source which is remote from but accessible from computer system 202 containing the database management system. In the following discussion, local data sources are data sources internal to DBMS storage 102 and non-local data sources are data sources that are not internal to DBMS storage 102. The non-local data sources may further be classified as external data sources, which are any data sources that are external to DBMS storage 102 but are accessible within the local addressing context of computer system 202, and remote data sources, which are accessible from computer system 202 but do not belong to the local addressing context of computer system 202. In a preferred embodiment, BLOBs 117 are examples of local data sources, Bfiles 119 are examples of external data sources, and sites accessible via the World Wide Web are examples of remote data sources.

Database table 205(i) in DBMS storage 102 includes a column 207 whose fields are objects that have an object-relational data (ORD) class. As will be explained in detail later, ORD classes make the type repertory of a database system expandable and to at least some extent user-definable. In a preferred embodiment, there are predefined ORD classes for objects that represent image data, audio data, or video data. Each of these ORD classes inherits a class called ORDSource, which makes it possible for a field 209($a \ldots n$) of, ORD column 207 to represent a BLOB 117, a Bfile 119, or data in a remote source 211. In FIG. 2, it is presumed that ORD column 207 has an image data ORD class, and that the Bfiles 119, remote sources 211, or BLOBs 210 contain image data. Each ORD field 209 has associated with it a BLOB 117, as shown at ORD field BLOBs 210. Thus, ORD field BLOB 210($a$) is associated with ORD field 209($a$) and so forth. Additionally, a given ORD field 209 may have a Bfile 119 associated with it or data 213 from a remote source. Thus, ORD field 209($b$) represents Bfile 212($b$), ORD field 209(m) represents image data 213 in remote source 211($e$), and ORD field 209($n$) represents image data 213 in remote source 211($r$).

The relationship between an ORD field 209($i$) and the source of its data is dynamic; ORD field 209($i$) may at one time represent data from a remote source 211 ($e$), at another a Bfile 119, and at another only its BLOB 210($i$). The ORDSource class provides methods for importing data from a Bfile 119 or a remote source 21 into BLOB 210($i$) and also for exporting data from BLOB 210($i$) to a Bfile 119 or a remote source 211. Since the data is under transaction control while it is in BLOB 210($i$), but otherwise not, this provides a mechanism for dynamically placing the data represented by a given ORD field 209($i$) under transaction control or for removing the data from transaction control. As will be explained in more detail later, the ORDSource class includes user-definable methods for dealing with the remote sources, and ORD classes can thus be created to deal with any present or future kind of remote source. As will also be explained in detail later, the methods for the ORDSource class may be dynamically bound to objects belonging to the class.

Figure 3:
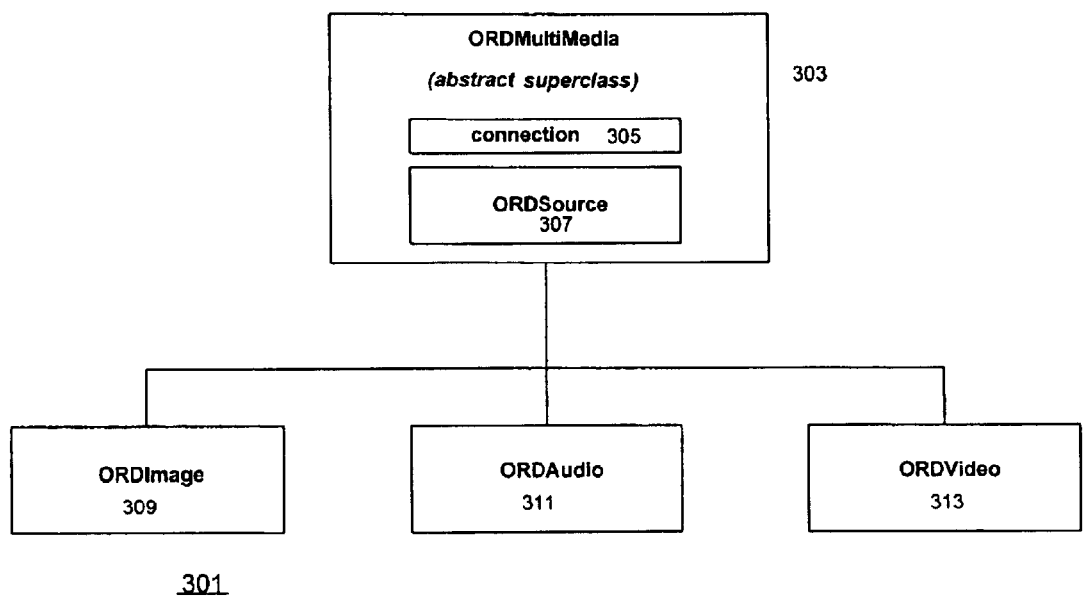
FIG. 3 shows the class hierarchy for ORD classes.
Figure 4:
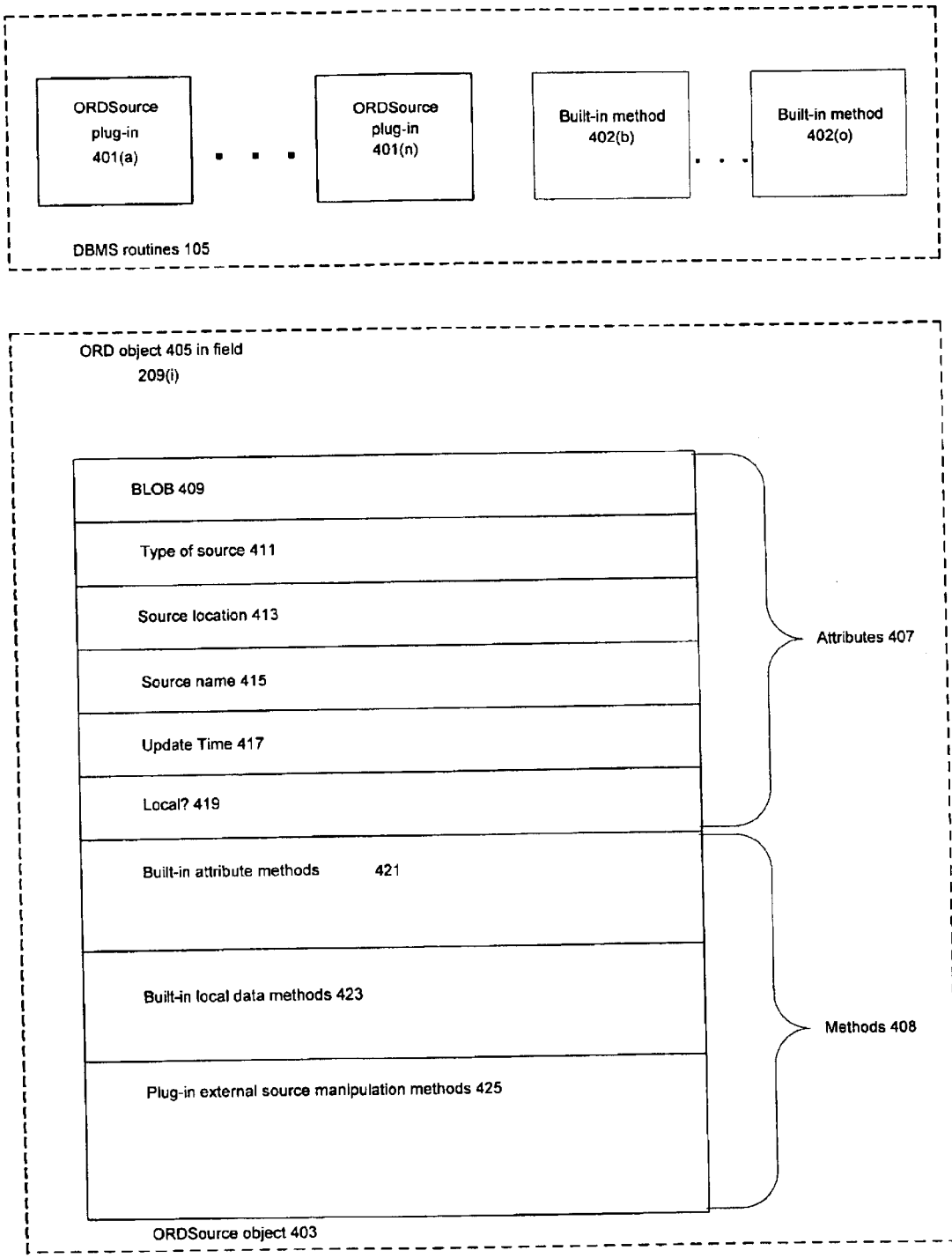
FIG. 4 is an overview of the ORDSource class and its methods.

Details of the ORDSource Class: FIGS. 3–4

FIG. 3 shows the class hierarchy 301 for ORD classes. In a preferred embodiment, there are three predefined ORD object classes: ORDImage 309 for objects representing image data, ORDAudio 311 for objects representing audio data, and ORDVideo 313 for objects representing video data. Each of these classes is derived from an ORDMulti-Media abstract superclass 303, and consequently inherits the superclass components connection 305 and ORDSource 307. Connection 305 specifies the current connection between data in a remote source and the ORD object that represents the data and ORDSource 307 specifies the information necessary to transfer data between an ORD object and the remote source. Since the ORDAudio, ORDImage, and ORDVideo classes all inherit the ORDSource class, objects of the inheriting classes all include objects belonging to the inherited ORDSource class.

Overview of an ORDSource Object: FIGS. 4 and 6

FIG. 4 shows an ORDSource object 403 in an ORD object 405 in an ORD field 209($i$). Conceptually, ORDSource object 403 has two main types of components: attributes 407, which is the object's data, and methods 408, which are the operations that can be performed on the object. In the preferred embodiment, methods 408 are implemented by means of routines in DBMS routines 105; as will be explained in detail in the following, some of the routines used to implement the methods are built-in, as shown at 402, while others are plugin routines provided by users of the database system for different kinds of external data sources.
Attributes 407 The attributes 407 in a preferred embodiment are defined as follows:

BLOB 409: contains the locally stored data stored as a BLOB 117 within the object. Up to 4 gigabytes of data can be stored as a BLOB within the database of the preferred embodiment database. The BLOB's contents are protected by the Oracle security and transaction environment.

Type of source 411: identifies a subclass of the ORD-Source class that corresponds to a kind of data source that is external to DBMS storage 102. Supported kinds of external data sources in a preferred embodiment are:
"FILE" A BFILE on a local file system;
"HTTP" An HTTP server;
"<name>" User-defined;

Source location 413: identifies the place where data can be found based on type of source 411. Valid source location values for corresponding source type values are:
for "FILE": <DIR> or name of the directory object;
for "HTTP": <SourceBase> or URL needed to find the base directory;
for "<name>": <iden> or identifier string required to access a user-defined source;

Source name 415: identifies the data object name. Valid source name values for corresponding source type values are:
for "FILE": <FILE> or name of the file;
for "HTTP": <Source> or name of the object;
for <name>: <object name> or name of the object;

Update time 417: the time at which the data whose source is specified by ORDSource was last updated.

Local?: a flag to determine whether or not the data is local:
1 means the data is in the BLOB.
0 means the data is in a source external to DBMS storage 102.

Attribute Methods 421

The attribute methods manipulate the attributes 407. These methods are all built-in.
ORDSource Methods associated with Local? 419:
setLocal: sets the flag value for Local? 419 attribute to "1", meaning that the source of the data is local.
clearLocal: resets the flag value for Local? 419 to "0", meaning that the source of the data is external to DBMS storage 102.
isLocal: returns TRUE to indicate that the source of the data is local, that is, in BLOB 409, or FALSE, meaning the data is in an external source. The value of the local, attribute is used to determine the return value.

ORDSource Methods associated with Update time 417:
getUpdateTime: returns the value of Update time 417;
setUpdateTime: sets the value of Update time 417 to the specified time provided in the argument.

ORDSource Methods associated with type of source 411, source location 413, and source name 415:
setSourceInformation( ): sets or alters type of source 411, source location 413, and source name 415 all at once;
getSourceInformation: returns a formatted string containing the current values of type of source 411, source location 413, and source name 415 formatted as a URL.
getSourceType: returns the current value of type of source 411;
getSourceLocation: returns the current value of source location 413;

getSourceName: returns the current value of source name 415.
getBFile: returns the handle (file system identifier) for a Bfile 119, if source type 411 is of type FILE.

Built-in Local Data Methods 423

These methods include the following:
getLocalContent: returns the handle (data base system identifier) for BLOB 409
ContentInTempLob( ): Transfers data from the source specified by attributes 411–415 into a temporary large object which is allocated and initialized when the method is executed.
deleteLocalContent: deletes the content of BLOB 409.

External Source Manipulation Methods 425

These methods are implemented using plugins. In a preferred embodiment, the plugins for Bfiles 119 and remote sites using the HTTP protocol are supplied by the maker of the database system. The plugins for the other external data sources are supplied by the user of the database system. The required interfaces for the plugins are shown in FIG. 6 at the reference numbers indicated in the following discussion.

ORDSource methods associated with import and export Operations
import( ) 612: transfers data from the external source identified by the current values of attributes 411 through 415 to BLOB 409 and sets local? to indicate that the data is in BLOB 409;
importFrom( ) 613: transfers data from an external data source specified when the method is invoked to BLOB 409 and sets local? to indicate that the data is in BLOB 409;
export( ) 615: transfers data from BLOB 409 to the external data source identified by the current values of attributes 411 through 415 and sets local? to indicate that the data is in the remote source.

ORDSource methods for obtaining information about the data source:
getContentLength( ) 617: returns the length of the data source. For BLOB 409 and a Bfile 119, the length is the number of bytes; for other sources, the length is measured as determined by the plugin for the type of source.
getSourceAddress( ) 619: returns the address of the data in a user-defined source.

ORDSource methods associated with access operations on external data sources:
open( ) 621: opens an external data source.
close( ) 623: closes an external data source.
trim( ) 625: trims an external data source to a length that is specified as an argument when the method is invoked.

ORDSource methods associated with source read/write operations. These methods can be used with local and external sources; the plugins for the methods for local sources are provided by the manufacturer of the database system; those for remote sources are user-defined:
read( ) 627: reads a buffer of n bytes from a source beginning at a start position in the data source.
write( ) 629: writes a buffer of n bytes to a source beginning at a start position in the data source.

ORDSource method for processing commands directed to an external data source:
processCommand( ) 611: process a command directed to a user-defined external source. For example, if the external source were a source of streaming data that could respond to a fast forward command, the processCommand method can be used to provide the command to the external source.

Figure 5:
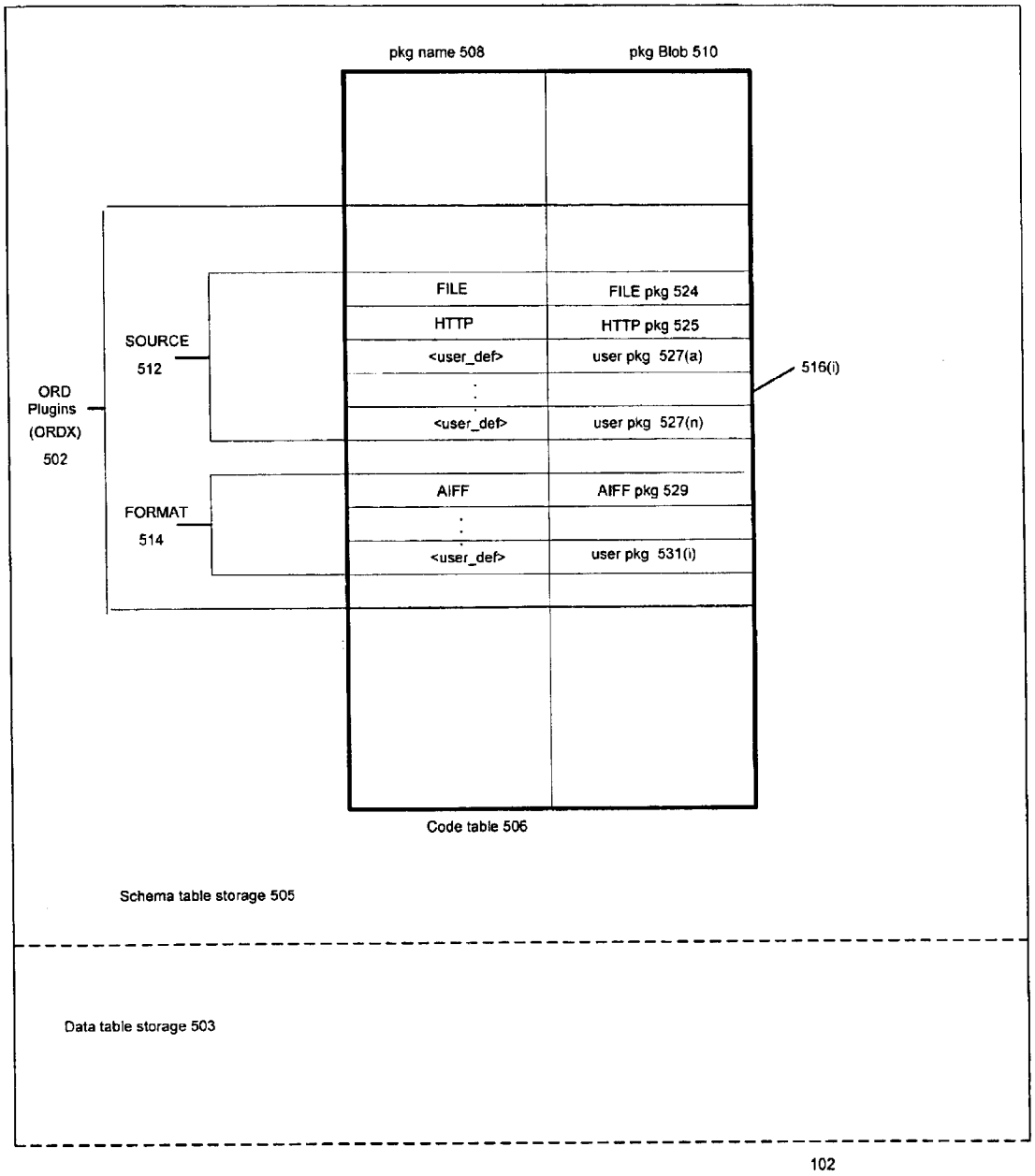
FIG. 5 is an overview of the table in the database schema that is used to locate the methods for an ORDSource object.

Implementation of the Plugins: FIGS. 5 and 6

In a preferred embodiment, the plugins are stored in and accessible via the database management system's schema. The schema is the portion of the database management system that contains description of the tables in which the data itself is stored. Included in the descriptions is code that is executed in connection with the tables. In the database system of the preferred embodiment, the schema is itself implemented as tables 107. FIG. 5 shows schema table storage 505 and data table storage 503 in storage 102 for the database system. Within schema table storage 505, there is a single code table 506 for the table-related executable code. Code table 506 has two columns that are of present interest: pkg name column 508 contains the names of packages of code; pkg BLOB 510 contains handles for BLOBs 117. The BLOB 117 contains the actual code for the package. Each package has a row 516 in code table 506, with the package's name in column 508 and the handle for the BLOB 117 containing the package's code in column 510.

In a preferred embodiment, code table 506 is subdivided to provide a number of separate namespaces. One of these namespaces is subdivision 502 for ORD plugins. Within that namespace, there are two further subdivisions of interest, SOURCE subdivision 512, which contains rows for the plugins for subclasses of ORDSource class 307, and FORMAT subdivision 514, which contains rows for plugins for FORMAT methods. The FORMAT methods and their uses will be explained later. In SOURCE subdivision 512, the value in pkg name 508 is the name of the ORDSource subclass that the package contains the methods for. Shown are rows for the built-in FILE and HTTP subclasses, with the handles 524 and 525 for the BLOBs 117 containing the code, and rows for user-defined subclasses with their package handles 527(*a* . . . *n*).

In the preferred embodiment, the database system locates packages in code table 506 by name. A package for a subclass of ORDSource has a name of the form ORDX_<pkg name>_SOURCE Thus, the package for the built-in FILE subclass has the name ORDX_FILE_SOURCE. ORDX indicates that the package is in ORD Plugins 502; SOURCE indicates that it is in SOURCE portion 512; FILE matches FILE in pkg name 508 and indicates the row 516 in SOURCE. Thus, when a program executed by the database system specifies that one of the object's methods be executed on the object, the database system can use the object's class to locate SOURCE portion 512 and the value of type of source attribute 411 to locate the row 516 for the subclass specified by the value, and use pkg BLOB field 510 to locate the package. Within the package, the method can be located by the method's name and the code can then be executed. If a method has not been implemented for a subclass and a program attempts to execute the method on an object of the subclass, the attempted execution raises a METHOD_NOT_SUPPORTED exception. For example, the preferred embodiment treats Bfiles 119 as read only, consequently, the processCommand, export, trim, and write methods are not supported for the FILE subclass. Similarly, if a program attempts to execute a method for a non-existent package, the attempted execution raises a SOURCE_PLUGIN_EXCEPTION.

Details of a Package for a Subclass: FIG. 6

FIGS. 6A, B, and C show the package template 601 that is provided in a preferred embodiment for the code that implements the methods for a user-defined subclass of the ORDSource class. In the preferred embodiment, the package of methods for a subclass of ORDSource is identified by a name of the form ORDX_<user_subclass_name>_<SOURCE. Thus, where the package is for an ORDSource subclass for a streaming server such as one using a REAL AUDIO protocol, the user might give the subclass the name REALAUDIO and the package name would be ORDX_REALAUDIO_SOURCE.

In the preferred embodiment, template 601 is written in the PL/SQL programming language. It may, however, be written in any language which the database system is able to compile. For details on PL/SQL, see Scott Urman, Oracle8 PL/SQL Programming, ISBN: 0-07-882305-6, available from McGraw-Hill. Each method of the ORDSource subclass has a procedure or function template in the package. The template for the processCommand function is shown at 603. The template contains the predefined call interface 605 for the function, a comment 607 (indicated by a preceding "—") which the user may replace with the variables that his or her processCommand method requires in addition to the formal arguments specified in 605, and a comment 609 which the user may replace with the code for his or her processCommand method.

As may be seen from the rest of FIG. 6, each of the other procedure or function templates works in the same way as processCommand template 603. The procedure or function for each of the methods takes as arguments at least the ORDSource object for which the method is being invoked and a ctx object which is 4000 bits long and whose value is not interpreted as a database system type (indicated by the RAW type specification). The ctx object is used for information which is particular to the source and is required for manipulation of the source. For example, with a streaming audio subclass, ctx may contain the flow control information required for streaming audio. With an HTTP subclass, ctx: may contain the URL for the Web page being operated on by the method. In the preferred embodiment, a starting value for ctx is obtained from the data source when the data source is opened. See open function 621.

Figure 11:
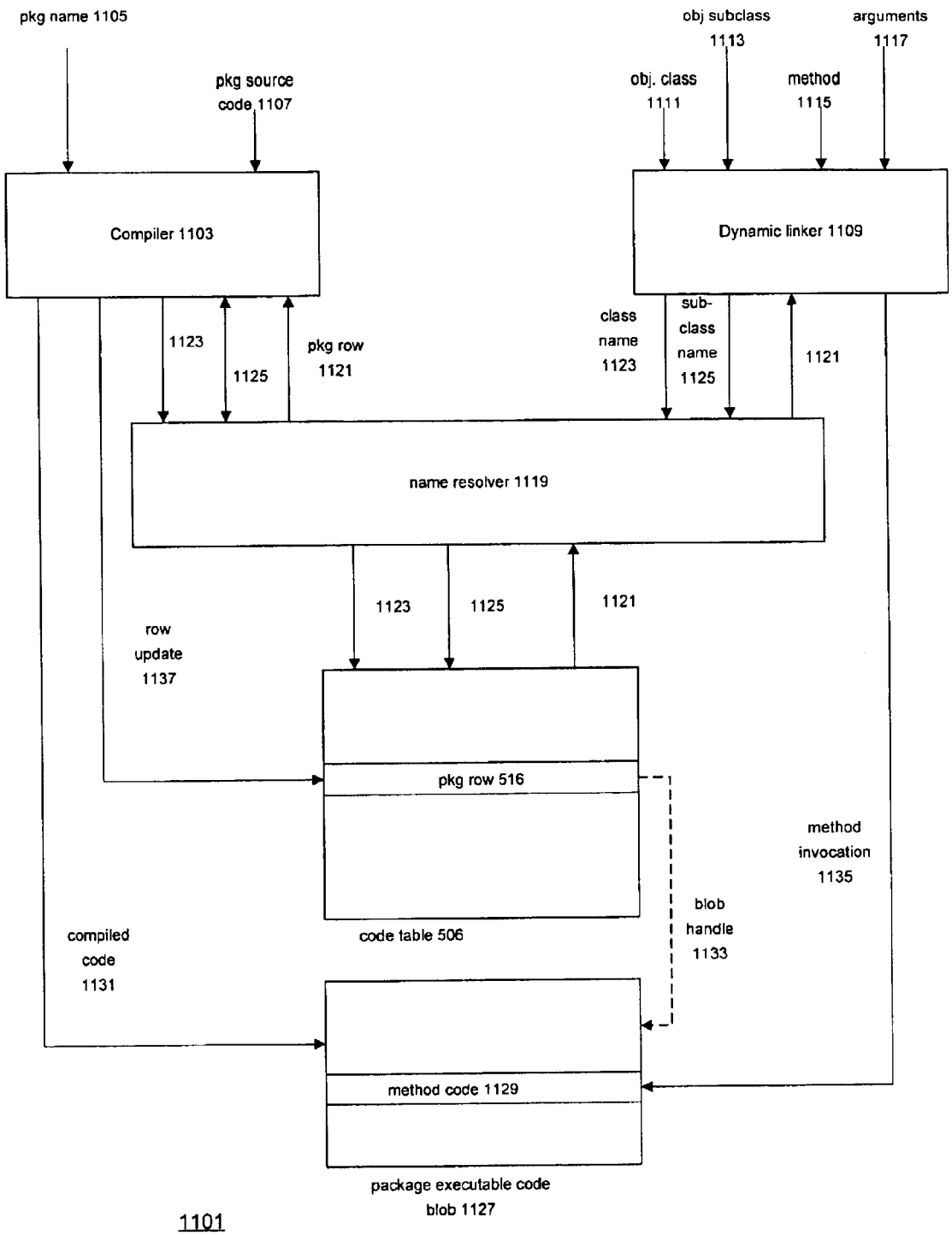
FIG. 11 shows the techniques used for compiling and execution package code in a preferred embodiment.

Installing a Package: FIG. 11

At 610 in FIG. 6 is shown the SQL/PL statement that adds the following code for a package to the SOURCE module. The name following PACKAGE BODY is the package name, which has the form <ord class name>_<subclass name>_<module name>. For the package for the REALAUDIO subclass of the ORDX class in the module for the ORDSource type, PACKAGE BODY would be followed by ORDX_REALAUDIO_SOURCE. FIG. 11 shows how the database system responds to statement 610. In system 1101 of FIG. 11, compiler 1103 receives the package name, in this case, ORDX_REALAUDIO_SOURCE, at 1105, and the package source code at 1107. Compiler 1103 compiles source code 1107 to produce compiled code 1131. Compiler 1103 also parses package name 1105 to obtain the name of the portion of code table 506 that contains the row for the package, here SOURCE 512, and the name of the package, here REALAUDIO. With ORDSource classes, SOURCE represents the class and REALAUDIO the subclass. Compiler 1103 provides these names to name resolver 1119, which responds by returning package row 1121 for the subclass, if the row exists. Compiler 1103 then uses blob handle 1133 from the row's column 510 to locate BLOB 1127 for the package. Thereupon, compiler 1103 writes compiled code 1131 to blob 1127. If there is no row for the subclass 512, the compiler inserts a new row 516 in code table 506, with the subclass's name in column 508 and the handle for BLOB 1127 in column 510 and then writes compiled code 1131 to BLOB 1127. The database system of the preferred embodiment also has provisions for executing compiled code contained in files external to the database system; thus, a package can also be implemented using any programming language for which there is a compiler on the computer system upon which the database system is executing.

Package Execution: FIG. 11

The database system of the preferred embodiment dynamically links the code for a method belonging to an ORDSource subclass at the time that code being executed by the database system invokes the method. Linking is done by name. The invocation of the method specifies the ORDSource object, the method name, and the arguments for the invocation. The database system determines that the object is an ORDSource object and reads the object's subclass from type of source attribute 411. As shown in FIG. 11, the database system then provides the object's class 1111, subclass 1113, the method name 1115, and the arguments to dynamic linker 1109, which passes class name 1123 and subclass name 1125 to name resolver 1119. Name resolver 1119 uses class name 1123 and subclass name 1125 to locate package row 516 for the subclass's package and returns the row as shown at 1121 to dynamic linker 1109. Dynamic linker 1109 uses blob handle 1133 in row 516 to locate BLOB 1127 and then uses method name 1115 to locate method code 1129 in BLOB 1127. Thereupon, dynamic linker 1109 invokes method code 1129 with arguments 1117. The database system of the preferred embodiment maintains a cache in the main memory of the computer system upon which the database system is running, and once code in BLOB 1127 has been invoked, BLOB 1127 is copied to the cache, where it remains as long as it is being invoked with sufficient frequency that the cache management system does not remove it from the cache.

Using Methods: FIG. 7

FIG. 7 shows an example 701 of PL/SQL database system code that uses an object's processCommand method. The code presumes the existence of a database table TS with a single column of ORDSource objects s and n rows. Previous invocations of the setSourceInformation method have set type of source 411, source location 413, and source name 415 for each of the ORDSource objects in the table. Declarations 703 declare a local ORDSource object obj, an object res to hold the value returned by processCommand, and variables for the actual arguments required for process Command. Statement 705 selects the ORDSource object s in the first row of table TS and copies it into the local object obj. The statements at 707 provide a character string specifying a command to which the remote source responds to the variable command and an argument for the command in the variable argList. At 709, the processCommand method is invoked on the local object obj with the arguments required for the method.

The database system responds to the invocation by using obj's type of source attribute 411 to locate the package 601 for the subclass of ORDSource specified by attribute 411 and then locates the code for the processCommand method in the package and begins executing it using the arguments of the invocation and obj's source location attribute 413 and source name attribute 415 to provide the specified command to the source represented by obj. When the execution of the method is finished, statement 711 causes obj to be copied back into row 1 of TS. Shown at 713 is the code that handles exceptions that may be raised in example 701. If there is no processCommand method defined for the subclass specified by the object's type attribute 411, the METHOD_NOT_SUPPORTED exception is thrown; if there is no package at all for the object's subclass, the SOURCE_PLUGIN_EXCEPTION is thrown; there is a handler for each of these exceptions; OTHERS handles any other exceptions that may be thrown.

Figure 8:
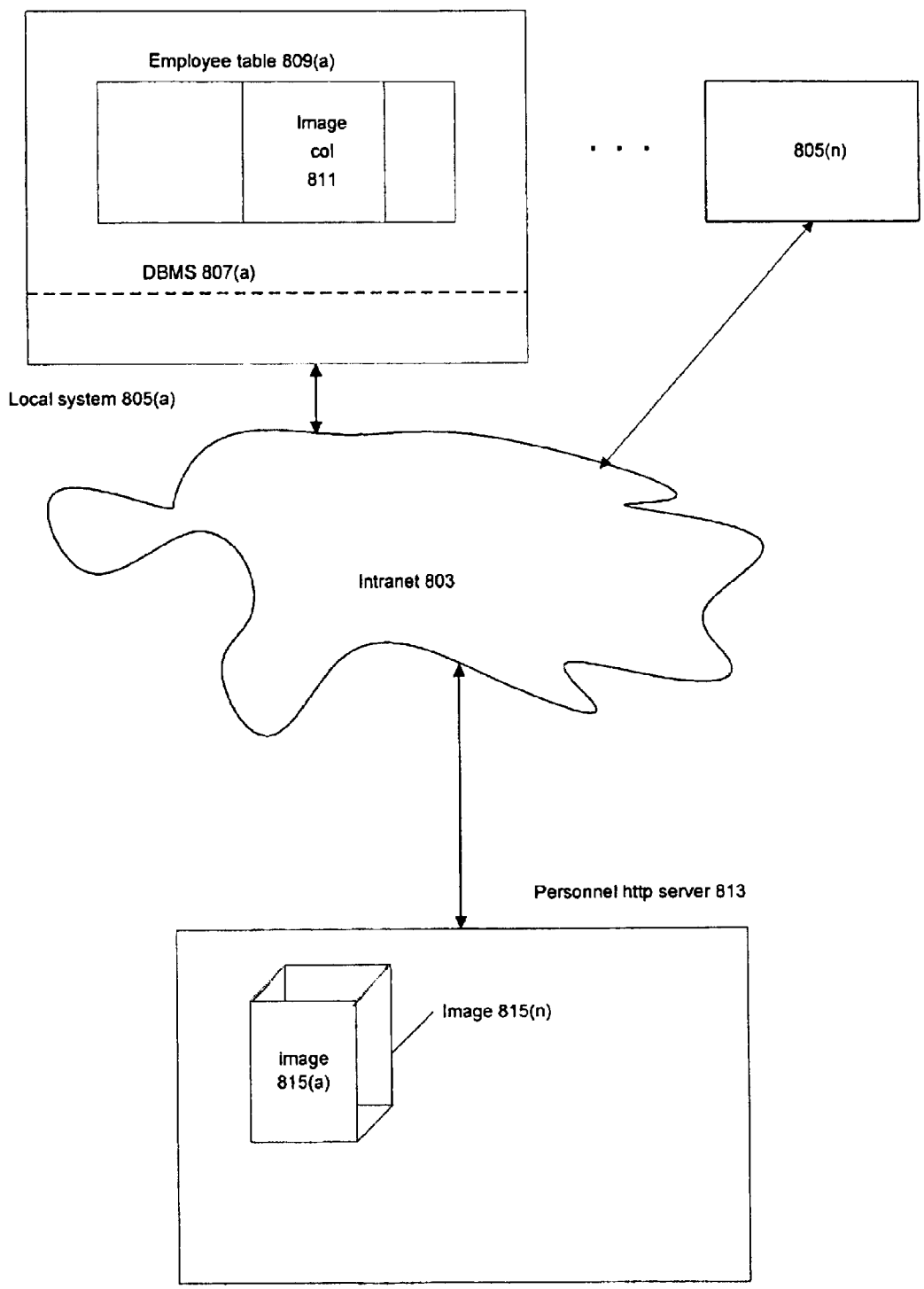
FIG. 8 is a first example application of ORDSource.
Figure 9:
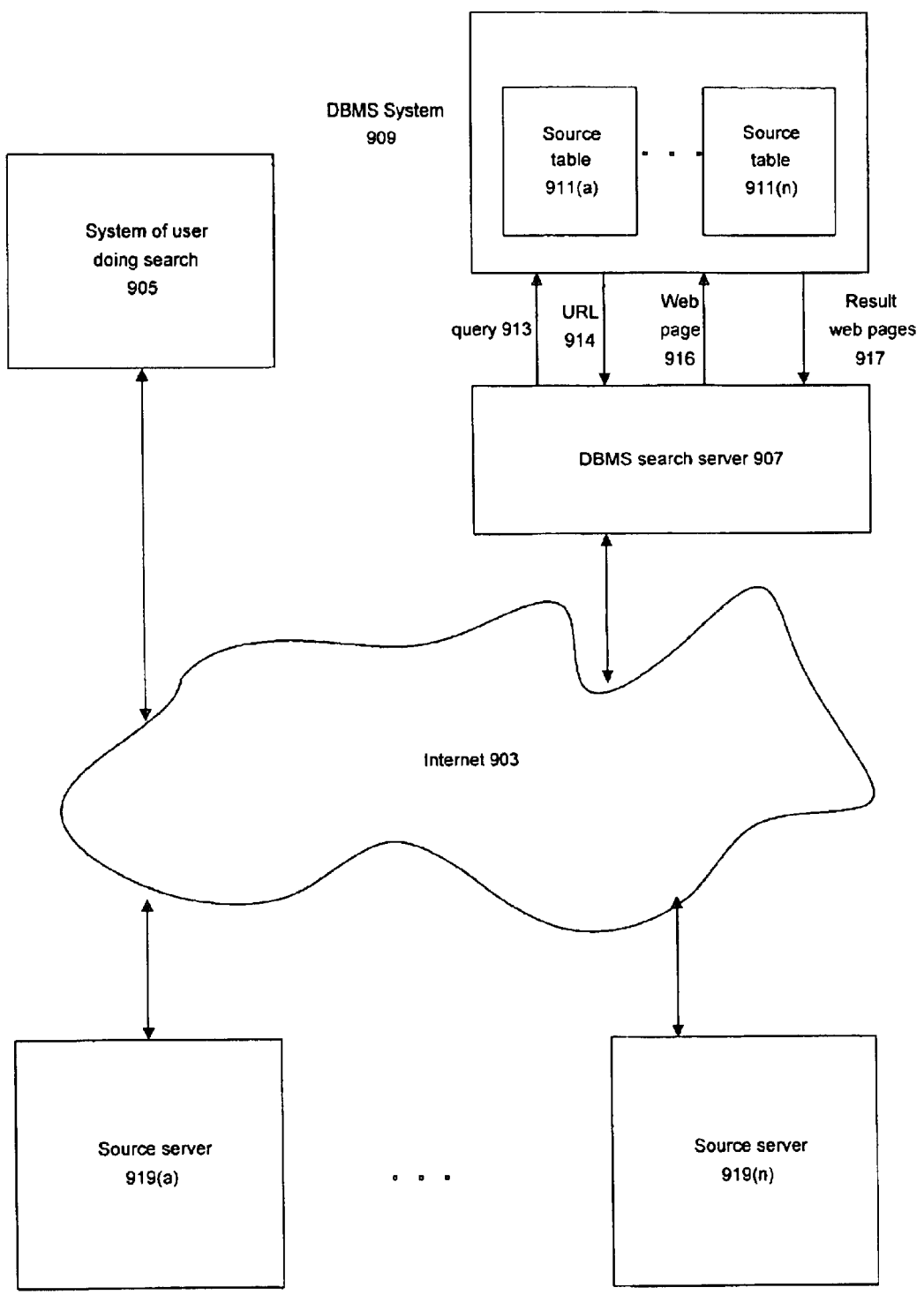
FIG. 9 is a second example application of ORDSource.
Figure 10:
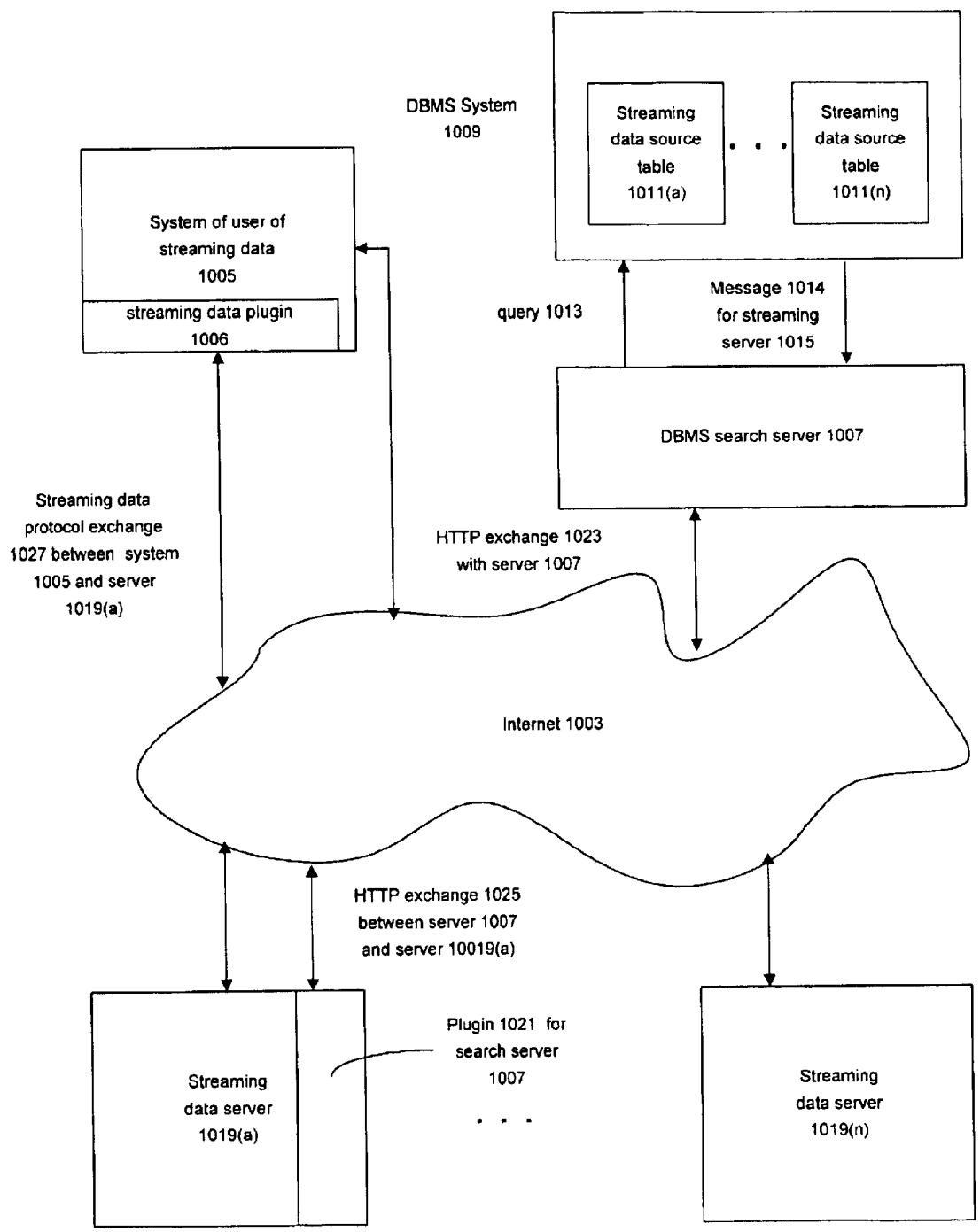
FIG. 10 is a third example application of ORDSource.

Applications of Database Systems With ORDSource: FIGS. 8–10

Access by Distributed Databases to Centrally-stored Information: FIG. 8

One area in which values belonging to the ORDSource class are useful is when an entity has distributed database systems that need access to centrally-stored information. FIG. 8 shows such an application 801. The entity keeps images 815($a \ldots n$) of all of its employees on a personnel http server 813 which is accessible to all of the entity's locations by means of entity intranet 803. At least some of the entity's locations have local DBMS systems 807 running on local computer systems 805($a \ldots n$). Each local computer system 805 can communicate via intranet 803 with http server 813. Each local DBMS system 807 has an employee table 809 which has a row for each of the employees of the entire entity. Included in employee table 809 is a column 811 for the images of the employees. Column 811's values are ORDImage values, and since the source of the data for the ORDImage values is server 813, the ORDSource values all belong to the HTTP subclass. Thus, when a query of DBMS 807 specifies an employee's image, DBMS 807 can import the image via Intranet 803 from server 813 and to the ORDImage's BLOB 117 and then return the image from BLOB 117 in response to the query.

Moreover, because the ORDSource values include local? attribute 419, DBMS 807($i$) in a given system 805($i$) can set local? to indicate that the image is in the BLOB 117 for the employees at the location of system 805($i$) from http server 813 and thereupon simply fetch them from the BLOBs 117, thus effectively caching the images locally and making operation of DBMS 807 much more efficient for local employees.

In a presently-preferred embodiment, the handle of an ORDSource object's local BLOB is set when the object is created and can thereafter be read using the getLocalContent method but;cannot be altered. In other embodiments, there may be a method for setting the BLOB's handle, and in such embodiments, it is also possible to save storage by making a pool of BLOBs that is only slightly larger than the number of local employees and then using standard caching techniques such as LRU so that an employees from another location who visited the given location would also automatically have his or her image locally cached for at least the duration of the visit. The built-in HTTP subclass does not support the processCommand or export methods; if it were replaced by a user-defined subclass that did support those methods, it would further be possible to export an image from-table 809 to personnel http server 813, which might, for example, be done when the location at which system 805($i$) is located makes a new photograph of an employee or even to export an image for a new employee to personnel HTP server 813.

Using a Database System with ORDSource Values to Locate Materials on the WEB: FIG. 9

Values belonging to the ORDSource class also make it easy to use a database management; system to locate material on the Web. FIG. 9 shows such a system 901. Here, a user; on system 905 is doing research on the Internet. The materials the user wants to locate are on a number of source servers 919(a . . . n). The user could use a standard Web search engine for the search, but desires more precision than is available with the search engine, so he or she uses DBMS search server 907 which is maintained by a specialized information retrieval service. The user of system 905 sends queries via the Internet to DBMS search server 907. DBMS search server receives the queries and if they are not already in a query language which DBMS system 909 can interpret, translates the queries into that language. The resulting query 913 is provided to DBMS system 909, which contains a number of source tables 911. These source tables contain rows which relate sources of information that are accessible via Internet 903 to concepts that are used in querying the information. For example, DBMS server 907 may be maintained by a legal information retrieval source and source tables 911 may be part of a legal research database that relates legal concepts to legal material that is publicly available on the Internet. The source of information are represented in the rows by values belonging to the HTTP subclass of the ORDSource class.

When DBMS system 909 receives search request 913, it selects the rows of interest in the tables 911 and applies the import method to the ORDSource values in the selected rows. The import: method in turn provides the URL 914 from source location attribute 413 to DBMS search server 907, which fetches the page specified by the URL from source server 919(i) specified by the URL. DBMS search server 907 then collects the pages, and when it has all of them, it provides them as a result 917 to DBMS search server 907, which in turn provides them to user system 905. As was the case with the employee images in system 901, other embodiments may permit system 901 to cache information retrieved from source servers 919(a . . . n) in the BLOBs of the ORDSource objects and may also use a pool of BLOBs and a LRU algorithm to reduce the amount of storage required at any given point. An example would be where DBMS system 909 maintains information relevant to current events. In such a case, a new event is typically followed by a flood of queries on related subjects.

Using a Database System with ORDSource to Connect a Web User With a Server of Streaming Data: FIG. 10

Streaming data is data such as audio or video data. Streaming data differs from character or image data in the following characteristics:

the system receiving the streaming data interprets the streaming data as it receives it, without waiting for all of the streaming data to arrive;

streaming data has time constraints. The system that is receiving the streaming data must receive a sequence of chunks of the streaming data in a fashion such that for each chunk of stream data, a next chunk is available for interpretation by the system within a set time after the current chunk was available for interpretation.

Because of the time constraints, streaming data requires that a connection exist between the system that is sending the streaming data and the system that is receiving it while the streaming data is being transferred. Where the streaming data is movies or video, the connection may last for hours.

Because of the time constraints and the number of bits required to adequately represent audio and video, the connection generally requires substantial amounts of bandwidth for its entire life.

All of these characteristics make it difficult to access streaming data via a database system. First, even the BLOBs of the database system of the preferred embodiment are not large enough to store an entire movie. Second, databases generally deal with receiving a query and returning results as punctual events; the results are not returned subject to time constraints, and it is generally assumed that they will be returned quickly, and not subject to time constraints and over a period of hours. Because that is the case, there is no mechanism in most database systems for allocating a guaranteed amount of bandwidth to a query for an extended period of time.

Though database systems are not well-suited to delivering streaming data, they are excellent for finding streaming data. For instance, a database system containing data about what is available on various audio streaming data servers can easily locate all of the works by the composer for which interpretations by the artist are available on the streaming data servers. Because of the problems with delivering streaming data through a database system, database systems have generally been limited to providing the location of the desired streaming data to the user, with a separate interaction between the user and the source of the streaming data being required to actually obtain the video or audio data.

With ORDSource objects, another approach is possible, as shown in FIG. 10. FIG. 10 shows a system 1001 for using a database system not only to find the desired data on a streaming data server 1019(i) for a user of a system 1005, but also to initiate the delivery of the streaming data from streaming data server 1019(i) to system 1005. In FIG. 10, system 1005, DBMS search server 1007, and a number of streaming data servers 1019(a . . . n) are all accessible by means of Internet 1003. DBMS search server 1007 serves as the front end for DBMS system 1009, which contains tables 1011 that permit location of streaming data items on streaming data servers 1019. In tables 1011, the streaming data items are represented by values that belong to the ORDSource class. A user-defined package as described above has specified methods for the streaming data items.

System 1001 works as follows: the user of system 1005 uses the system's Web browser to enter into an HTTP exchange 1023 with server 1007, in which the user specifies the kinds of streaming data items the user is looking for. DBMS search server 1007 makes a query based on the user's specification and provides it to DBMS system 1009, which returns results indicating what is available. DBMS search server 1009 and the user of system 1005 continue exchanging information until the user of system 1005 makes a choice of a given streaming data item. At that point DBMS search server 1005 makes a query 1013 to "retrieve" the field that represents the given streaming data item. In response to this query, DBMS system 1009 executes the open method for streaming data items. This method does not, however, actually open the given streaming data item for import into DBMS system 1009. Instead, it returns a message 1014 to DBMS search server 1007. The message contains at least the URL of the given streaming data item and may also contain a description of the streaming data item. DBMS search server 1007 adds at least the current IP address of system 1005 to the message and initiates HTTP exchange 1025 between DBMS search server 1007 and plugin 1021 for search server 1007 in streaming data server 1019(i) that contains the given streaming data item. The exchange provides plugin 1021 with the information it needs to specify a connection between system 1005 and streaming data server 1019(i). Once the connection is specified, streaming data server 1019(i) establishes the connection with streaming data plugin 1006 in system 1005 and begins interacting with the plugin according to streaming data protocol 1027. Thus, having initiated the establishment of a connection between streaming data server 1019(*i*) and system 1005, DBMS search server 1007 "steps aside" and thereby avoids the necessity of running the streaming data connection through DBMS system 1009.

FORMAT Plugins: FIGS. 12 and 13

A problem with digital representations generally is that there may be different digital representations of the same thing. For example, in some computer systems, characters are represented using ASCII character codes; in others, they are represented using EBCDIC codes. In both cases, what is represented is characters, and the same operations are performed with characters using either representation; what is different is the format used to represent the characters. As what is represented grows more complex, the problem of different representations increases. There are at present a number of widely-used formats for image data, audio data, and video data. As with the character codes, however, the basic operations that are performed with image data are the same, regardless of the format used, and the same is true of audio data and image data.

Because the operations are the same for the different formats, it is possible to define classes of image objects, audio objects, and video objects. An example of such a class is ORDAudio class 311. The problem with such classes is how one deals with the different formats in the context of the class. The solution provided in the database management system described herein is to define a FORMAT package for each of the different formats. The package contains methods for reading each of the formats and a method that permits general processing of the format, including translation from one format to another. The effect of the FORMAT package is to make a subclass of the image, audio, or video class for each of the formats. The mechanisms used to create the format package, place it in the database schema, and execute a package's methods are the same as for the ORDSource subclass packages. Thus, as shown in FIG. 5, code table 506 includes a FORMAT portion 514, with a built-in package 529 for the AIFF audio format used in Apple McIntosh® computer systems and a user-defined package 531(*i*) for a format for which there is no built-in package. In the following, the ORDAudio subclass that has the FORMAT methods for the AIFF audio format will be described in detail.

FIG. 12 shows those parts of ORDAudio class definition 1201 that are relevant to the present discussion. The attributes 1203 include an ORDSource object, a format attribute that specifies the format of the data represented by the audio object and thereby indicates a subclass of the audio class that uses a particular FORMAT package, and then those attributes 1207 that are particular to audio objects. The values of these attributes are determined by the format of the particular audio data that the object represents.

Of the ORDAudio methods, only those that involve format attribute 1205 and the audio related attributes 1207 are shown, at 1211. The three methods bracketed at 1213 show the relationship between ORDAudio methods that are provided by the FORMAT package and those that are not. setFormat 1215 sets format 1205; getFormat 1217 reads format 1205; these methods are not part of the FORMAT package. getFormat 1219 is. It reads data belonging to the subclass defined by format 1205 to find the value given in the data for the data's format and returns that value. Of course, the return value may be assigned to a variable and that variable used in setFormat to set format 1205, thus dynamically changing the subclass of the object. One area where this is useful is where a given audio format has a number of different subformats, with the value specifying the format always being in the same place in the data. When an ORDAudio object of the class is constructed, format 1205 can be set to one of the subformats, and getFormat 1219 can be used to read the data's actual format. The methods for the rest of the attributes are generally similar: there is a method for setting the attribute, a method for reading the attribute, and a FORMAT method for reading the attribute's value from the data represented by the object. In addition, there is the FORMAT method processCommand, which permits arbitrary processing of the audio data. For example, it could be used to invoke a translator which would translate the audio data from one format into another.

The operations performed by the methods shown in FIG. 12 are explained in the following:

setFormat( ): sets the object attribute value of the format of the audio data.

getFormat: returns the object attribute value of the format in which the audio data is stored.

getFormat( ): calls the FORMAT plugin to read the actual format embedded in the stored audio data.

setEncoding( ): sets the object attribute value of the encoding type of the audio data.

getEncoding: returns the object attribute value of the encoding type of the audio data.

getEncoding( ): calls the FORMAT plugin to read the actual encoding type embedded in the stored audio data.

setNumberOfChannels( ): sets the object attribute value of the number of audio channels of the audio data.

getNumberOfChannels: returns the object attribute value of the number of audio channels in the audio data.

getNumberOfChannels( ): calls the FORMAT plugin to read the actual number of channels embedded in the stored audio data.

setSamplingRate( ): sets the object attribute value of the sampling rate of the audio data.

getSamplingRate: returns the object attribute value of the sampling rate in samples per second at which the audio data was recorded.

getSamplingRate( ): calls the FORMAT plugin to read the actual sampling rate embedded in the stored audio data.

setSampleSize( ): sets the object attribute value of the sample width or number of samples of audio in the data.

getSampleSize: returns the object attribute value of the sample width or number of samples of audio in the data.

getSampleSize( ): calls the FORMAT plugin to read the actual sample width or number of samples embedded in the stored audio data.

setCompressionType( ): sets the object attribute value of the compression type of the audio data.

getCompressionType: returns the object attribute value of the compression type of the audio data.

getCompressionType(): calls the FORMAT plugin to read the actual compression type embedded in the stored audio data. This method is available only for user-defined FORMAT plugins.

setAudioDuration( ): sets the object attribute value of the total time value of the time required to play the audio data.

getAudioDuration: returns the object attribute value of the total time required to play the audio data.

getAudioDuration( ): calls the FORMAT plugin to read the actual playing time embedded in the stored audio data. This method is available only for user-defined FORMAT plugins.

setKnownAttributes( ): sets known audio attributes including format, encoding type, number of channels, sampling rate, sample size, compression type, and audio duration of the audio data. The parameters are passed in with this call.

setProperties( ): reads the audio data to get the values of the object attributes and then stores them in the object. For the known attributes that ORDAudio understands, it sets the properties for these attributes. These include: format, encoding type, data type, number of channels, sampling rate, and sample size of the audio data.

checkProperties( ): calls the FORMAT plugin to check the properties including format, encoding type, number of channels, sampling rate, and sample size of the audio data, and returns a Boolean value TRUE if the properties stored in object attributes match those in the audio data.

getAttribute( ): returns the value of the requested attribute. This method is only available for user-defined FORMAT plugins.

getAllAttributes( ): returns a formatted string for convenient client access. For natively supported formats, the string includes the following list of audio data attributes separated by a comma (','): FileFormat, Encoding, NumberOfChannels, SamplingRate, and SampleSize. Different FORMAT plugins can return data in any format in this call. For user-defined formats, the string is defined by the FORMAT plugin.

processCommand( ): sends commands and related arguments to the FORMAT plugin for processing. This method is available only for user-defined FORMAT plugins.

FIG. 13 shows a package template 1301 for a package of FORMAT plugins for the AIFF audio format. As shown at 1303, the naming convention for the package is the same as for ORDSource packages: ORDX specifies that the package row will be in ORD Plugins 502 in code table 506, AIFF specifies the value that will be in pkg name column 508 in the row and AUDIO specifies an AUDIO portion of code table 506. The interface for the getFormat method is shown at 1213. As before, code bodies must be written for each of the methods that is to be implemented for the FORMAT plugin. Compilation and execution of FORMAT plugins is as described for ORDSource plugins.

Conclusion

The foregoing Detailed Description has disclosed to those skilled in the relevant arts the best mode presently known to the inventors of practicing their techniques for integrating data from external sources into a database system. As will be immediately apparent to those skilled in the relevant arts, there are many particular ways of implementing systems which embody the principles of the inventors' techniques. For example, the techniques may be practiced in any database system which has a mechanism for defining classes, but details will vary with the particular mechanism used to define the classes. Similarly, the inventors have implemented their techniques in the context of the ORDSource class and of FORMAT packages for image, audio, and video classes, but the techniques are not limited to those contexts and may be used anywhere where it is advantageous to have values in database columns that represent polymorphous data. The methods for a particular set of subclasses will of course depend on the purpose for which the set of subclasses is to be used. In ORDSource and FORMAT, the inventors have selected sets of methods that appeared most useful to them for the purposes of the subclasses defined by means of the methods, but other implementers might well select other sets of methods to attain those purposes. In compiling and linking their packages, the inventors have used arrangements that were available in the database system of the preferred embodiment; other implementers will similarly use whatever arrangements are available in the database system in which they are using the techniques of the invention.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A relational database system comprising:

fields in a table of the relational database system that are defined as having values that represent sources of data, the values being objects whose classes are subclasses of a class that is built into the relational database system; and subclass defining apparatus which permits a user of the relational database system to define the subclasses.

2. The relational database system set forth in claim 1 wherein:

the fields are in a column of the table whose fields have the built-in class and the objects in the fields may belong to different subclasses of the built-in class.

3. The relational database system set forth in claim 1 wherein:

objects belonging to the built-in class have a predetermined set of attributes and may be manipulated using a predetermined set of methods; and the subclass defining apparatus permits the user to define a specifier for the subclass and methods for a subset of the predetermined set of methods.

4. The relational database system set forth in claim 3 wherein:

the predetermined set of attributes includes the subclass specifier that specifies the object's subclass;

the predetermined methods includes a method that sets the subclass specifier; and the database system uses the subclass specifier to locate the methods for the specified subclass.

5. The relational database system set forth in claim 4 wherein:

the database system includes data tables including the table with the column and schema tables that define the data tables; and the subclass defining apparatus includes a schema table which relates the subclass specifier to the subclass's methods; and the database system uses the schema table to locate the methods for the specified subclass.

6. The relational database system set forth in claim 5 wherein:

the subclass defining apparatus further includes a method installer that compiles source code for a subclass's methods, stores the object code produced by the compiler in the database system, and updates the schema table so that the database system can use the schema table to located the object code for the methods.

7. The relational database system set forth in claim 1 wherein:

the predetermined set of attributes includes a non-local data source specifier that specifies a particular kind of non-local source for the data represented by the object;

the predetermined set of methods includes a method that sets the non-local data source specifier and the subset of user-defined methods for the specified subclass includes methods for manipulating the kind of non-local data sources represented by the subclass.

8. The relational database system set forth in claim 7 wherein:

the predetermined set of attributes further includes a local data specifier that specifies a local data source for the data represented by the object and a local specifier that specifies whether the data represented by the object is in the specified local data source;

the methods include a method that sets the local specifier and the subset of the methods includes an import method that imports data from the non-local data source to the specified local data source.

9. The relational database system set forth in claim 8 wherein:

the subset of the methods includes an export method that exports data from the local data source to the specified non-local data source.

10. The relational database system set forth in claim 7 wherein:

the subset of the methods includes a method that provides a command to a non-local data source of the subclass's kind.

11. The relational database system set forth in claim 7 further comprising:

a built-in subclass of the built-in class for files that are local to a computer system upon which the database system is running.

12. The relational database system set forth in claim 7 further comprising:

a built-in subclass of the built-in class for data sources that obey the HTTP protocol.

13. The relational database system set forth in claim 4 wherein:

the data represented by objects of the built-in class has a plurality of formats; and the subclasses correspond to certain ones of the formats.

14. The relational database system set forth in claim 13 wherein:

the methods for the subclasses read format information from the data.

15. The relational database system set forth in claim 14 wherein:

the methods include a method for reading a format type from the data.

16. The relational database system set forth in claim 13 wherein:

the built-in classes include a class for audio objects.

17. The relational database system set forth in claim 13 wherein:

the built-in classes include a class for image objects.

18. The relational database system set forth in claim 13 wherein:

the built-in classes include a class for video objects.

19. A relational database system that runs on a computer system that has access to data from different kinds of sources, the relational database system having the improvement comprising:

at least one table having at least one column with at least two fields, one of the at least two fields containing a value specifying a first source and the first source's kind and another containing a value specifying another source and the other source's kind, the other source's kind being different from the first source's kind;

executable code including first executable code that manipulates sources of the first source's kind to perform an operation and second executable code that manipulates sources of the other source's kind to perform the operation; and a code selector to select and execute executable code for the operation according to a field's value.

20. The relational database system set forth in claim 19 wherein:

at least one of the first executable code and the second executable code is defined by a user of the database system.

21. The relational database system set forth in claim 20 wherein:

the user-defined code is accessed by the database system via a table in the database system's schema.

22. The relational database system set forth in claim 19 wherein:

at least one of the sources is of a kind that is non-local to the database system.

23. The relational database system set forth in claim 22 wherein:

sources of the non-local kind are within the computer system.

24. The relational database system set forth in claim 22 wherein:

sources of the non-local kind are accessible from but outside the computer system.

25. The relational database system set forth in claim 22 wherein:

each of the values in the column's fields specifies a local source in addition to any source belonging to a non-local kind; and the operation is an import operation that imports data from the source of the non-local kind to the local source.

26. The relational database system set forth in claim 25 wherein:

the operation is an export operation that exports data from the local source to the source of the non-local kind.

27. The relational database system set forth in claim 22 wherein:

the operation is providing a command to the source.

28. The relational database system set forth in claim 22 wherein:

the kind of one of the sources is a file in the computer system.

29. The relational database system set forth in claim 22 wherein:

the kind of one of the sources is a source that obeys the HTTP protocol.

30. The relational database system set forth in claim 19 wherein:
   the data from the first source and the data from the second source represent the same kind of entity but have different formats; and
   the operation is reading format information from the data.

31. A data storage device characterized in that the data storage device contains code which when executed by a processor implements a relational database system comprising:
   fields in a table of the relational database system that are defined as having values that represent sources of data, the values being objects whose classes are subclasses of a class that is built into the relational database system; and
   subclass defining apparatus which permits a user of the relational database system to define the subclasses.

32. The data storage device set forth in claim 31 further characterized in that:
   the fields are in a column of the table whose fields have the built-in class and the objects in the fields may belong to different subclasses of the built-in class.

33. The data storage device set forth in claim 31 further characterized in that:
   objects belonging to the built-in class have a predetermined set of attributes and may be manipulated using a predetermined set of methods; and
   the subclass defining apparatus permits the user to define a specifier for the subclass and methods for a subset of the predetermined set of methods.

34. The data storage device set forth in claim 33 further characterized in that:
   the predetermined set of attributes includes the subclass specifier that specifies the object's subclass;
   the predetermined methods includes a method that sets the subclass specifier; and
   the database system uses the subclass specifier to locate the methods for the specified subclass.

35. The data storage device set forth in claim 34 further characterized in that:
   the database system includes data tables including the table with the column and schema tables that define the data tables; and
   the subclass defining apparatus includes a schema table which relates the subclass specifier to the subclass's methods; and
   the database system uses the schema table to locate the methods for the specified subclass.

36. The data storage device set forth in claim 35 further characterized in that:
   the subclass defining apparatus further includes a method installer that compiles source code for a subclass's methods, stores the object code produced by the compiler in the database system, and updates the schema table so that the database system can use the schema table to located the object code for the methods.

37. The data storage device set forth in claim 31 further characterized in that:
   the predetermined set of attributes includes a non-local data source specifier that specifies a particular kind of non-local source for the data represented by the object;
   the predetermined set of methods includes a method that sets the non-local data source specifier and
   the subset of user-defined methods for the specified subclass includes methods for manipulating the kind of non-local data sources represented by the subclass.

38. The data storage device set forth in claim 37 further characterized in that:
   the predetermined set of attributes further includes a local data specifier that specifies a local data source for the data represented by the object and a local specifier that specifies whether the data represented by the object is in the specified local data source;
   the methods include a method that sets the local specifier and
   the subset of the methods includes an import method that imports data from the non-local data source to the: specified local data source.

39. The data storage device set forth in claim 38 further characterized in that:
   the subset of the methods includes an export method that exports data from the local data source to the specified non-local data source.

40. The data storage device set forth in claim 37 further characterized in that:
   the subset of the methods includes a method that provides a command to a non-local data source of the subclass's kind.

41. The data storage device set forth in claim 37 further characterized in that:
   a built-in subclass of the built-in class for files that are local to a computer system upon which the database system is running.

42. The data storage device set forth in claim 37 further characterized in that:
   a built-in subclass of the built-in class for data sources that obey the HTTP protocol.

43. The data storage device set forth in claim 34 further characterized in that:
   the data represented by objects of the built-in class has a plurality of formats; and
   the subclasses correspond to certain ones of the formats.

44. The data storage device set forth in claim 43 further characterized in that:
   the methods for the subclasses read format information from the data.

45. The data storage device set forth in claim 44 further characterized in that:
   the methods include a method for reading a format type from the data.

46. The data storage device set forth in claim 43 further characterized in that:
   the built-in classes include a class for audio objects.

47. The data storage device set forth in claim 43 further characterized in that:
   the built-in classes include a class for image objects.

48. The data storage device set forth in claim 43 further characterized in that:
   the built-in classes include a class for video objects.

49. A data storage device, characterized in that:
   the data storage device contains code which when executed by a processor implements a relational database system that has access to data from different kinds of sources, the relational database system having the improvement comprising:
      at least one table having at least one column with at least two fields, one of the at least two fields containing a value specifying a first source and the first source's kind and another containing a value specifying another source and the other source's kind, the other source's kind being different from the first source's kind;

executable code including first executable code that manipulates sources of the first source's kind to perform an operation and second executable code that manipulates sources of the other source's kind to perform the operation; and a code selector to select and execute executable code for the operation according to a field's value.

50. The data storage device set forth in claim 49 further characterized in that:

at least one of the first executable code and the second executable code is defined by a user of the database system.

51. The data storage device set forth in claim 50 further characterized in that the user-defined code is accessed by the database system via a table in the database system's schema.

52. The data storage device set forth in claim 49 further characterized in that:

at least one of the sources is of a kind that is non-local to the database system.

53. The data storage device set forth in claim 52 further characterized in that:

sources of the non-local kind are within the computer system.

54. The data storage device set forth in claim 52 further characterized in that:

sources of the non-local kind are accessible from but outside the computer system.

55. The data storage device set forth in claim 52 further characterized in that:

each of the values in the column's fields specifies a local source in addition to any source belonging to a non-local kind; and the operation is an import operation that imports data from the source of the non-local kind to the local source.

56. The data storage device set forth in claim 55 further characterized in that:

the operation is an export operation that exports data from the local source to the source of the non-local kind.

57. The data storage device set forth in claim 52 further characterized in that:

the operation is providing a command to the source.

58. The data storage device set forth in claim 52 further characterized in that:

the kind of one of the sources is a file in the computer system.

59. The data storage device set forth in claim 52 further characterized in that:

the kind of one of the sources is a source that obeys the HTTP protocol.

60. The data storage device set forth in claim 59 further characterized in that:

the data from the first source and the data from the second source represent the same kind of entity but have different formats; and the operation is reading format information from the data.

* * * * *